United States Patent
Tom et al.

(10) Patent No.: US 10,219,051 B2
(45) Date of Patent: Feb. 26, 2019

(54) COMMUNICATION PLATFORM WITH FLEXIBLE PHOTONICS PAYLOAD

(71) Applicant: Space Systems/Loral, LLC, Palo Alto, CA (US)

(72) Inventors: Harry Tom, Palo Alto, CA (US); William Hreha, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 15/604,165

(22) Filed: May 24, 2017

(65) Prior Publication Data

US 2018/0048948 A1    Feb. 15, 2018

Related U.S. Application Data

(60) Provisional application No. 62/374,309, filed on Aug. 12, 2016.

(51) Int. Cl.
| | |
|---|---|
| *H04Q 11/02* | (2006.01) |
| *H04B 10/29* | (2013.01) |
| *H04Q 11/00* | (2006.01) |
| *H04B 10/00* | (2013.01) |

(52) U.S. Cl.
CPC ......... *H04Q 11/0062* (2013.01); *H04B 10/00* (2013.01); *H04Q 11/0005* (2013.01); *H04B 2210/006* (2013.01); *H04Q 2011/0018* (2013.01); *H04Q 2011/0039* (2013.01); *H04Q 2011/0041* (2013.01); *H04Q 2011/0086* (2013.01)

(58) Field of Classification Search
CPC ........................... H04Q 11/0005; H04B 10/29
See application file for complete search history.

(56) References Cited

U.S. PATENT DOCUMENTS

| | | | | |
|---|---|---|---|---|
| 5,661,582 A | * | 8/1997 | Kintis | ............... H04B 7/18515 398/115 |
| 6,222,658 B1 | | 4/2001 | Dishman | |
| 6,819,874 B2 | | 11/2004 | Cheng | |

(Continued)

FOREIGN PATENT DOCUMENTS

EP        0771087 A2    6/1997

OTHER PUBLICATIONS

Gagliardi, "Satellite Communications," Second Edition, Department of Electrical Engineering, University of Southern California, ISBN 978-94-010-9760-4, 1991.

*Primary Examiner* — Shi K Li
(74) *Attorney, Agent, or Firm* — Vierra Magen Marcus LLP

(57) ABSTRACT

A communication platform (e.g., a flexible satellite) includes electrical to optical converters configured to convert input electrical signals to input optical signals, an optical switching network connected to the electrical to optical converters that choose which input optical signals to route to which output beams, tunable optical filters (connected to the switching network) that are configured to select programmable sub-bands of the input optical signals to create output optical signals, and optical to electrical converters (connected to the tunable optical filters) that are configured to convert the output optical signals to output electrical signals for the output beams.

21 Claims, 7 Drawing Sheets

(56) References Cited

U.S. PATENT DOCUMENTS

2003/0203733 A1* 10/2003 Sharon .................. H01Q 1/288
                                                                                 455/427
2016/0261340 A1* 9/2016 Yang ................ H04B 10/07953
2017/0339616 A1* 11/2017 Baudoin .............. H04B 7/1851

* cited by examiner

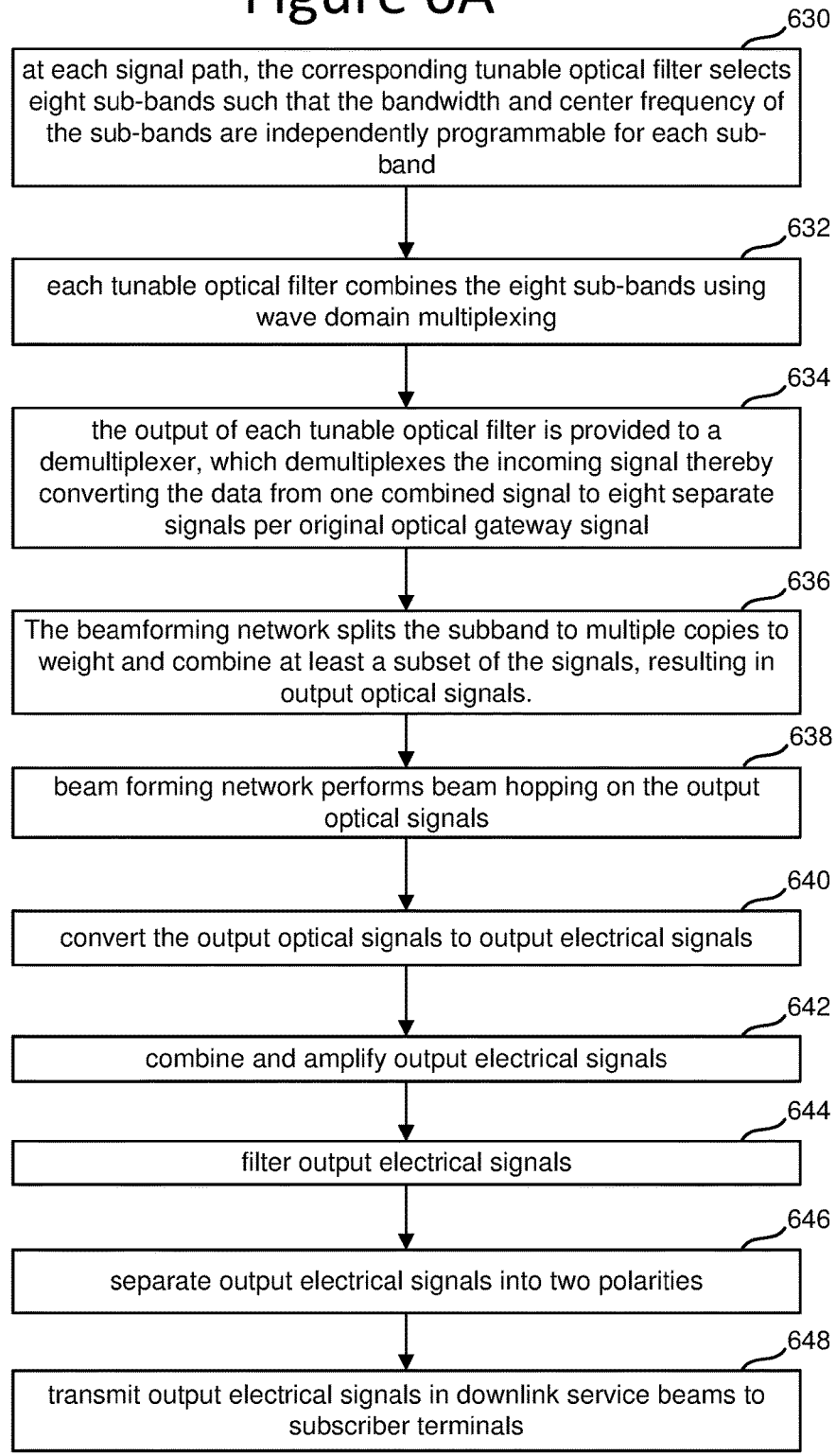

COMMUNICATION PLATFORM WITH FLEXIBLE PHOTONICS PAYLOAD

This application claims priority to U.S. Provisional Patent Application No. 62/374,309, "Flexible Capacity to Beam Assignment and Gateway Roll Out Using Photonics," filed on Aug. 12, 2016, incorporated herein by reference.

BACKGROUND

Wireless communication systems typically include a communication platform such as a dedicated terrestrial antenna, airborne platform or spacecraft (e.g., a satellite). Such platforms typically operate within regulations that allocate at least one operating frequency bandwidth for a particular set of communications. A growing market exists for provision of high data rate wireless communication services to consumers and businesses. To meet the demand, systems are being designed with increased capacities. However, systems with increased capacities can have large power consumption, required increased volume, and can be very expensive.

BRIEF DESCRIPTION OF THE DRAWINGS

FIGS. 6 and 6A together provide a flow chart describing one embodiment of a process for operating the payload of FIG. 3.

DETAILED DESCRIPTION

To be power and cost effective, a communication platform (e.g., a satellite) is proposed that is flexible in its use of its capacity, provides high performance and does not require too much power. To increase performance and lower the power needs, the communication platform (e.g., satellite) includes optical components to manage, utilize and otherwise configure the various communication signals. To allow for flexibility, the payload includes an optical switching network that chooses which input optical signals to route to which output beams and tunable optical filters (connected to the switching network) that are configured to select programmable sub-bands of the input optical signals. More details are provided below.

Figure 1:
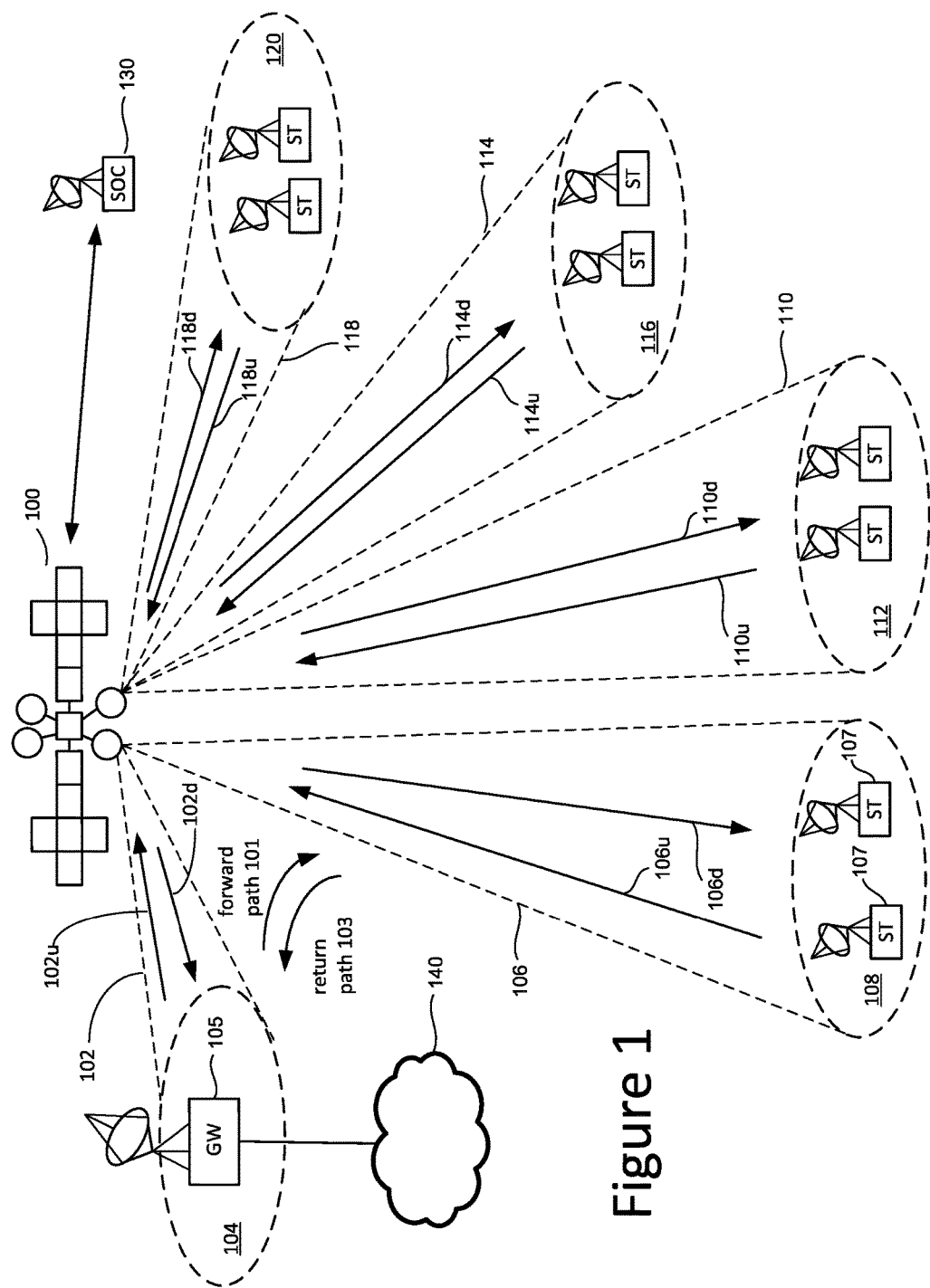
FIG. 1 is a block diagram of a communication system.

FIG. 1 depicts a block diagram of a wireless communications system that includes a communication platform 100, which may be a satellite (or other spacecraft) located, for example, at a geostationary or non-geostationary orbital location. The satellite can also be in Medium Earth Orbit (MEO), Low Earth Orbit (LEO) or another orbit. In other embodiments, other platforms may be used such as an airplane, a balloon, an Unmanned Aerial Vehicle (UAV), High Altitude Platform Station (HAPS), or even a ship for submerged subscribers. In yet another embodiment, the subscribers may be air vehicles and the platform may be a ship or a truck where the "uplink" and "downlink" in the following paragraphs are reversed in geometric relations.

Platform 100 may be communicatively coupled to at least one gateway 105 and a plurality of subscriber terminals ST (including subscriber terminals 107). The term subscriber terminals may be used to refer to a single subscriber terminal or multiple subscriber terminals. A subscriber terminal is adapted for communication with the wireless communication platform including a satellite. Subscriber terminals may include fixed and mobile subscriber terminals including, but not limited to, a cellular telephone, wireless handset, a wireless modem, a laptop, a desktop computer, a server, a router, a data transceiver, a paging or position determination receiver, or mobile radio-telephone, or a headend of an isolated local network. A subscriber terminal may be handheld, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile.

The at least one gateway 105 may be coupled to a network 140 such as, for example, the Internet, terrestrial public switched telephone network, mobile telephone network, or a private server network, etc. Gateway 105 and platform 100 communicate over a feeder beam 102, which has both a feeder uplink $102u$ and a feeder downlink $102d$. In one embodiment, feeder beam 102 is a spot beam that may operate in an assigned or allocated set of one or more frequency bands (e.g, V Band uplink and Q Band downlink) to illuminate, or collect from, a region 104 on the Earth's surface (or another surface). Although a single gateway is shown, typical implementations will include many gateways, such as five, ten, forty or more. Each gateway may utilize its own feeder beam, although more than one gateway can be positioned within a feeder beam. Note that the terms "feeder" beams and "service" beams are used for convenience and are with respect to the nominal direction. Both feeder beams and service beams are spot beams and the terms are not used in a manner to limit the function of any beam.

Subscriber terminals ST and platform 100 communicate over service beams; for example, FIG. 1 shows service beams 106, 110, 114 and 118 for illuminating regions 108, 112, 116 and 120, respectively. In many embodiments, the communication system will include more than four service beams (e.g., 60, 100, 200, etc.). Each of the service beams have an uplink ($106u$, $110u$, $114u$, $118u$) and a downlink ($106d$, $110d$, $114d$, $118d$) for communication between subscriber terminals ST and platform 100. Although FIG. 1 only shows two subscriber terminals within each region 108, 112, 116 and 120, a typical system may have thousands of subscriber terminals within each region. In one embodiment, feeder beam 102 operates in the V Band uplink and Q Band downlink and service beams 106, 110, 114 and 118 operate in the Ka Band. In other embodiment, feeder beam 102 and service beams 106, 110, 114 and 118 operates in Ku Band, or other frequency bands.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to platform 100 via uplink $102u$ of feeder beam 102, through a first signal path on platform 100, and from platform 100 to one or more subscriber terminals ST via downlink $106d$ of service beam 106. Although the above example mentions service beam 106, the example could have used other service beams.

Data can also be sent from the subscriber terminals ST over the return path 103 to gateway 105. In one example, communication over the return path comprises transmitting the data from a subscriber terminal (e.g., subscriber terminal 107 in service beam 106) to platform 100 via uplink 106u of service beam 106, through a second signal path on platform 100, and from platform 100 to gateway 105 via downlink 102d of feeder beam 102. Although the above example uses service beam 106, the example could have used any service beam.

FIG. 1 also shows a Satellite Operations Center 130, which includes an antenna and modem for communicating with platform 100, as well as one or more processors and data storage units. Satellite Operations Center 130 provides commands to control and operate platform 100. Satellite Operations Center 130 may also provide commands to any of the gateways and/or subscriber terminals.

The architecture of FIG. 1 is provided by way of example and not limitation. Embodiments of the disclosed technology may be practiced using numerous alternative implementations.

Figure 2:
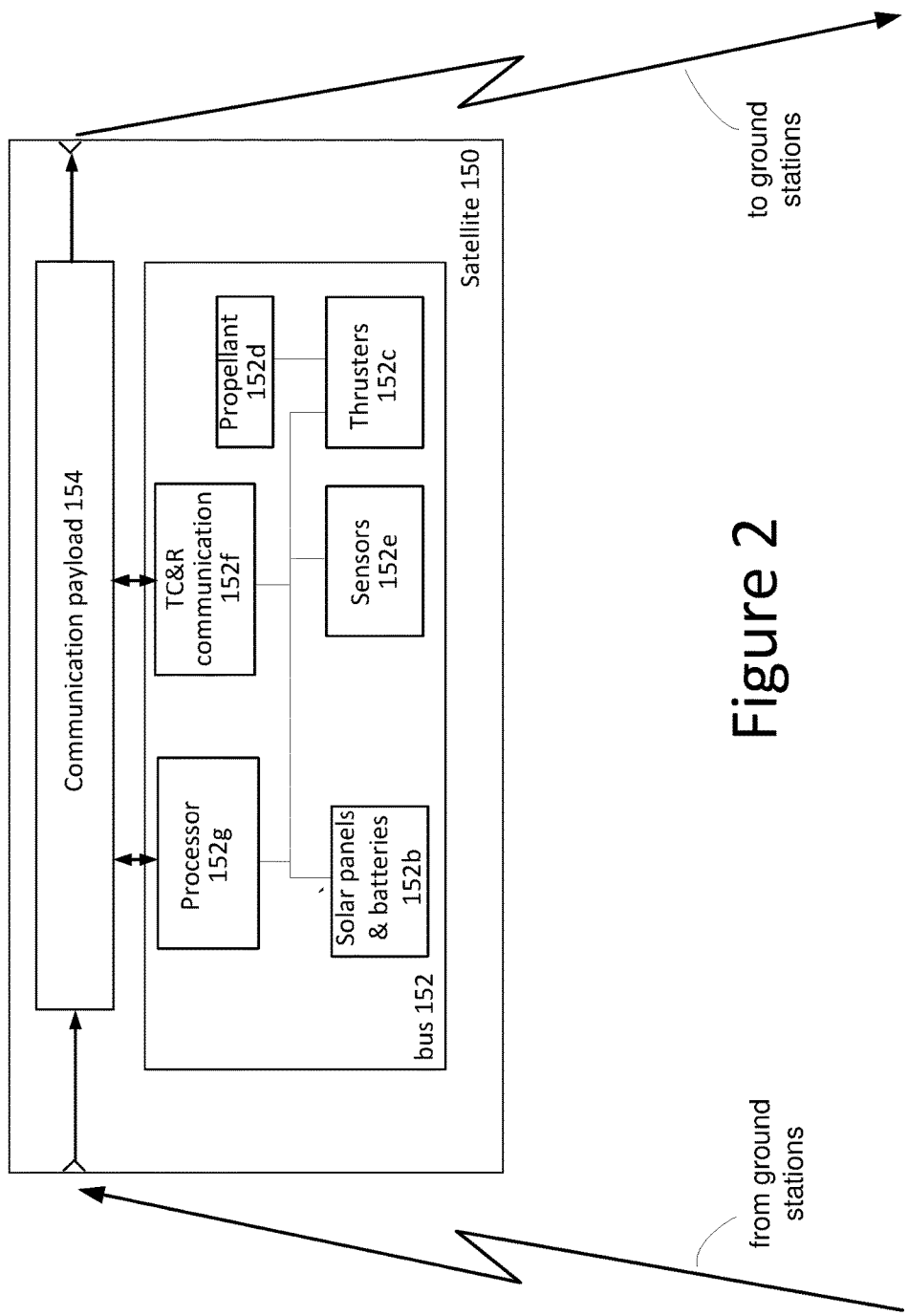
FIG. 2 is a block diagram of a satellite.

One embodiment of communication platform 100 of FIG. 1 is a satellite. FIG. 2 is a block diagram of an example satellite 150 that can be used as communication platform 100. In one embodiment, satellite 150 includes a bus 152 and a communication payload 154 carried by the bus 152. Some embodiments of satellite 150 may include more than one payload. The payload provides the functionality of the communication system described herein.

In general, the bus 152 is the spacecraft that houses the payload. For example, the bus includes solar panels and one or more batteries 152b, thrusters 152c, propellant 152d, sensors 152e, TC&R communication and processing equipment 152f, and processor 152g. Solar panels and batteries 152b are used to provide power to satellite 150. Thrusters 152c are used for changing the position or orientation of satellite 150 while in space. Propellant 152d is for the thrusters. Sensors 152e are used to determine the position and orientation of satellite 150. TC&R communication and processing equipment 152f, includes communication and processing equipment for telemetry, commands from the ground to the satellite and ranging to operate the satellite. Processor 152g is used to control and operate satellite 150. An operator on the ground can control satellite 150 by sending commands via TC&R communication and processing equipment 152f to be executed by system processor 152g. Some embodiments include a Satellite Operation Center that wirelessly communicates with TC&R communication and processing equipment 152f to send commands and control satellite 150. In one embodiment, processor 152g and TC&R communication and processing equipment 152f are in communication with the communication payload 154.

In one embodiment, the communication payload 154 includes an antenna system that provides a set of beams comprising a beam pattern used to receive wireless signals from ground stations and to send wireless signals to ground stations. In one example, an entire service region is covered using one beam. In another example, however, the antenna system provides a beam pattern that includes multiple spot beams, with each spot beam covering a portion of the service region. The portion of the service region covered by a spot beam is referred to as a cell. The individual spot beams (service beams) divide an overall service region into a number of cells. For example, U.S. Pat. No. 7,787,819 describes a pattern of 135 spot beams covering the continental United States (CONUS), Hawaii, Alaska, and Puerto Rico. It is noted that a service region may be defined in any manner to cover any desired geographic location. In one embodiment, the antenna system includes a phased array antenna, an agile multi-feed fed reflector a fixed beam multi-feed fed reflector.

Dividing the overall service region into a plurality of smaller cells permits frequency reuse, thereby substantially increasing the bandwidth utilization efficiency. In some examples of frequency reuse, a total bandwidth allocated to the uplink or downlink is divided into separate non-overlapping blocks for the forward path and the return path. Similarly, the total bandwidth allocated to the uplink is divided into separate non-overlapping blocks for the forward uplink and the return uplink. In other examples, some or all of the allocated bandwidth for service beams is reused by the gateway(s) 105, meaning that the gateway(s) 105 may reuse any part of the total bandwidth allocated to the service beams. This may be accomplished in various ways known in the art, such as by using spatial isolation, time domain isolation, code isolation, etc.

Figure 3:
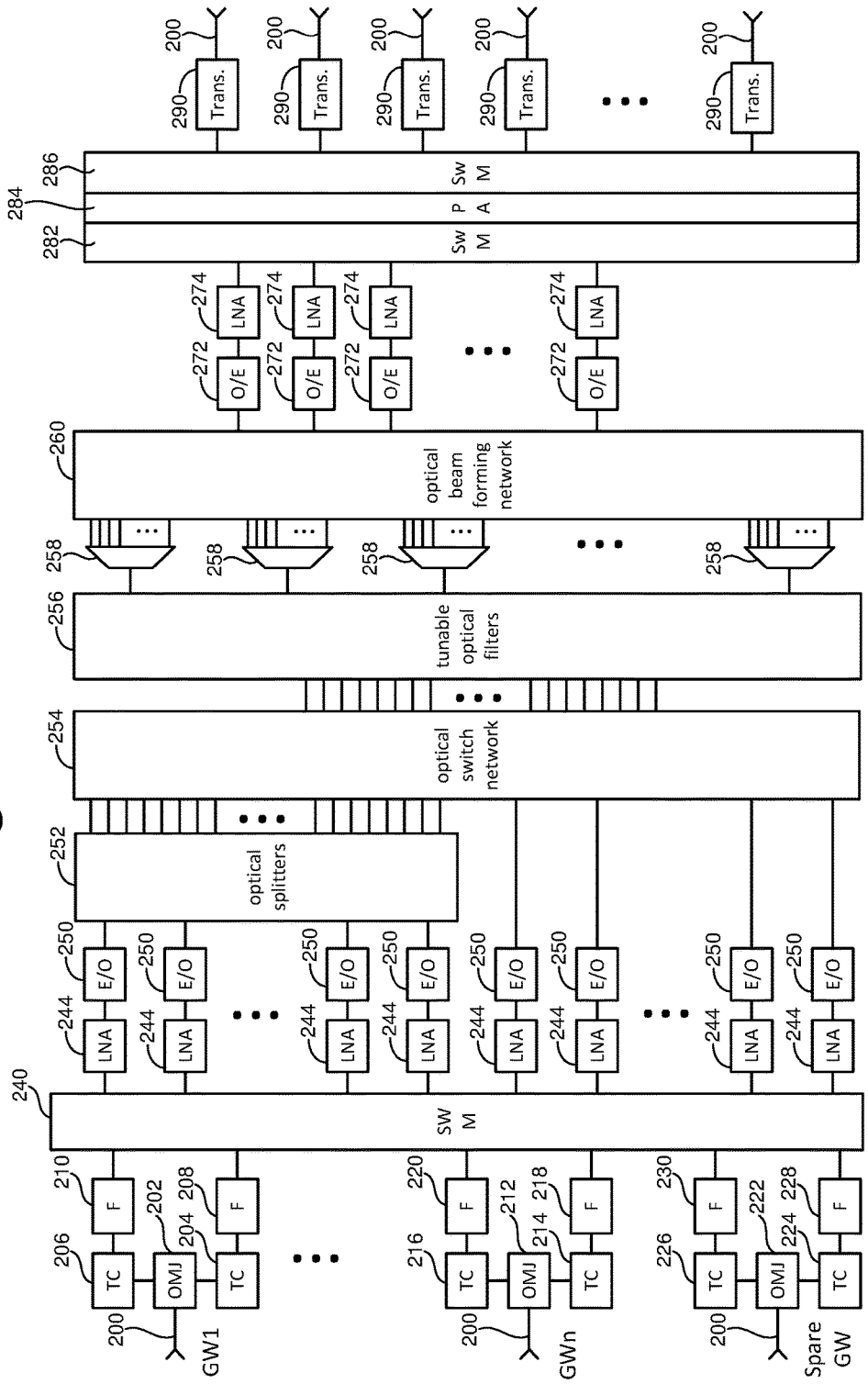
FIG. 3 is a block diagram of a payload for a satellite or other communication platform.

FIG. 3 is a block diagram of one embodiment of communication payload 154. Payload 154 is positioned on a spacecraft (e.g., satellite 150) and is configured to select a number of sub-bands of a first optical signal such that the bandwidth and center frequency of the sub-bands are independently programmable for each sub-band. The payload is configured to send content of the sub-bands to one or more entities off of the spacecraft. More details are provided below.

As depicted, communication payload 154 includes an antenna system 200 that provides a set of beams comprising a beam pattern used to receive wireless signals from ground stations (or airborne units) and to send wireless signals to ground stations (or airborne units). In one embodiment, the antenna system will include four antennas. In other embodiments, more or less than four antennas can be used. In some examples, an antenna can be used for both transmitting and receiving, while in other examples separate antennas are used for transmitting and receiving. Additionally, in some examples an antenna can be used for both feeder beams and service beams, while in other examples separate antennas can be used for feeder beams and service beams. In one embodiment, antenna system 200 communicates with gateways in the V Band uplink and Q Band downlink and communicates with subscriber terminals in Ka Band. In other embodiments Ka Band, Ku Band, or other frequency bands can be used for communication with gateways and/or subscriber terminals. The technology described herein is not limited to any specific frequency band.

The communication system includes n gateways. For example, FIG. 3 shows GW1 . . . GWn. In addition, there can be a spare gateway (Spare GW) to be switched in and used when any of the n primary gateways malfunction, is subject to rain fade or otherwise suffers from a performance issue. RF signals (electrical signals) from each of the gateways are received at antenna system 200. For example, FIG. 3 shows RF (electrical) signals from gateway 1 (GW1) received at antenna system 200 and provided to orthogonal mode junction (OMJ) 202. An OMJ is used to split an incoming signal by polarization. That is, the input to the OMJ is multiple signals on two polarizations (e.g., left hand circular polarization and right hand circular polarizations, or vertical polarization and horizontal polarization). The output of an OMJ includes a first signal group from one polarization and a second signal group from another polarization. The output of OMJ 202 is provided to test coupler (TC) 204 and TC 206. Thus, one polarization is provided to TC 204 and the other polarization is provided to TC 206. Test couplers are used to access the signal for testing or other purposes. Some embodiments will only use one polarization; therefore, only one TC is needed for each gateway. TC 204 forwards the signal to preselect filter 208. TC 206 forwards its signal to preselect filter 210. Filters 208 and 210 are filters with a predetermined pass band in order to filter out noise that may have been added to the signal during wireless transmission. As discussed above, the communication system will include n gateways. Each of the gateways will have an associated set of an OMJ connected to test couplers connected to filters connected to switch matrix 240. For example, gateway GWn will have its signals received at antenna system 200 and provided to OMJ 212, which forwards the signals to TC 214 and TC 216. TC 214 provides the signal to preselect filter 218. TC 216 provides its signal to filter 220. Similarly, the RF (electrical) signal received from the spare gateway by antenna system 200 are provided to OMJ 222, and then to TC 224 and TC 226. TC 224 forwards the signal to preselect filter 228. TC 226 forwards its signal to preselect filter 230. In the embodiment with n gateways, the output of the filters (e.g., 208, 210, . . . 218, 220) include 2n signal groups, which are provided to a switch matrix 240. In one embodiment, switch matrix 240 is used to provide fault tolerance. That is, if the components depicted in FIG. 3 were to break in space, they would not be easily fixed. Therefore, switch matrix 240 can be used to route signals to different paths to avoid faults. If there are no faults, the signals can be passed straight through switch matrix 240. Connected to the output of switch matrix 240 is a set of low noise amplifiers 244. In one embodiment, there is one low noise amplifier (LNA) for each signal (e.g., 2n signals). Each LNA 244 amplifies the incoming electrical signal. In one embodiment, each LNA will include a filter to remove noise introduced by the respective LNA.

Payload 154 of FIG. 3 includes a plurality of electrical to optical converters 250. Each electrical to optical converter 250 receives an electrical signal at its input and outputs a corresponding optical signal. As depicted in FIG. 3, each LNA 244 is connected to and provides its output to a separate electrical to optical converter 250. In one embodiment, the system of FIG. 3 includes a laser array that provides a set of lasers to a set of local oscillators. The output of the local oscillators are provided to the electrical to optical converters in order to convert the electrical signals to an optical signal at a desired wave length and/or bandwidth. No particular electrical to optical converter is required. There are many electrical to optical converters known in the art that can be used. As the input to the electrical to optical converters 250 are referred to as input electrical signals (or incoming electrical gateway signals) and the output of the electrical to optical converters are referred to as input optical signals (or optical gateway signals). Each of the optical signals that are on the output of the electrical to optical converters 250 represent a signal group from one gateway. Each gateway will have two such signal groups (one for each polarization).

Optical splitters 252 are connected to signals from a subset of gateways. More details are described below with respect to FIG. 4. The optical splitters make copies of the signals provided to the optical splitters. The output of the optical splitters 252 are provided to optical switch network 254. Those gateways that are not part of the subset gateways connected to optical splitter 252 have their corresponding signals provided from the electrical to optical converters 250 directly to optical switch network 254. In one embodiment, optical switch network comprises a plurality of optical switches which choose which outputs (e.g., down link spot beams) to route the optical gateway signals to. More details of optical switch network 254 are provided below with respect to FIG. 4.

The output of optical switch network 254 is provided to tunable optical filters 256. In one embodiment, each tunable optical filter receives an input optical signal from the connected optical switch network 254 and selects a number of sub-bands (e.g., eight sub-bands) from that input optical signal, such that the bandwidth and center frequency of each of those sub-bands are independently programmable for each sub-band. The sub-bands are package together using wave division multiplexing to create a single signal output from each tunable optical filter 256. Those outputs are then provided to connected de-multiplexers 258 which separate the eight sub-bands into eight separate signals. All the signals from all of the de-multiplexers 258 are provided as inputs to the connected optical beam forming network 260, which can combine any one or more of the inputs to create combined signals. As part of combining the signals, optical beam forming network 260 can weight any (subset or all) of the incoming signals to affect how signals are combined. For example, two sub-bands from two different gateways can be combined to create an aggregate signal which is provided to an output beam.

Optical beam forming network 260 can also perform TDM beam hopping to provide power flexibility. For example, the various signals that are output from optical beam forming network 260 can be divided into hopping groups. At any one instant in time only one of the signals in a hopping group are active, with the other signals being inactive and drawing no (or little) power. This provides for a reduction in power usage.

Although optical beam forming network 260 can weight and combine a subset (or all) incoming signals, other signals can pass through optical beam forming network 260 without being weighted or combined. All or subsets of the signals can be subjected to beam hopping. The output signals from optical beam forming network 260 are provided to a connected set of optical to electrical converters 272 that are configured to convert the various sub-bands (some combined and some not combined) to output electrical signals for transmission to one or more entities off of the satellite (spacecraft).

The outputs of optical to electrical converters 272 are provided to low noise amplifiers 274 to serve to amplify the electrical signals. In one embodiment, each LNA also includes a filter to remove noise from the amplification. The LNA's 274 are connected to and provide their output to amplifier 284. In one embodiment, amplifier 284 is a GaN power amplifier sandwiched between (and connected to) switch matrix 282 and switch matrix 286, both of which are used to provide fault tolerance. The outputs from power amplifier 284 (and switch matrix 286) are provided to a connected set of transmitters 290. In one embodiment, there is one transmitter for each downlink spot beam. Transmitters 290 are connected to antenna system 205 for transmission of the outputs from transmitters 290 to subscriber terminals, other gateways, other satellites, etc. More details of transmitters 290 are provided below with respect to FIG. 5.

In another embodiment, the output signals can be combined subsequent to the optical beam forming network 260 (instead or in addition to in optical beam forming network 260), for example before, in or after optical to electrical converters 272 or before, in or after LNA's 274 so that the combining can be accomplished optical or RF domains.

Figure 4:
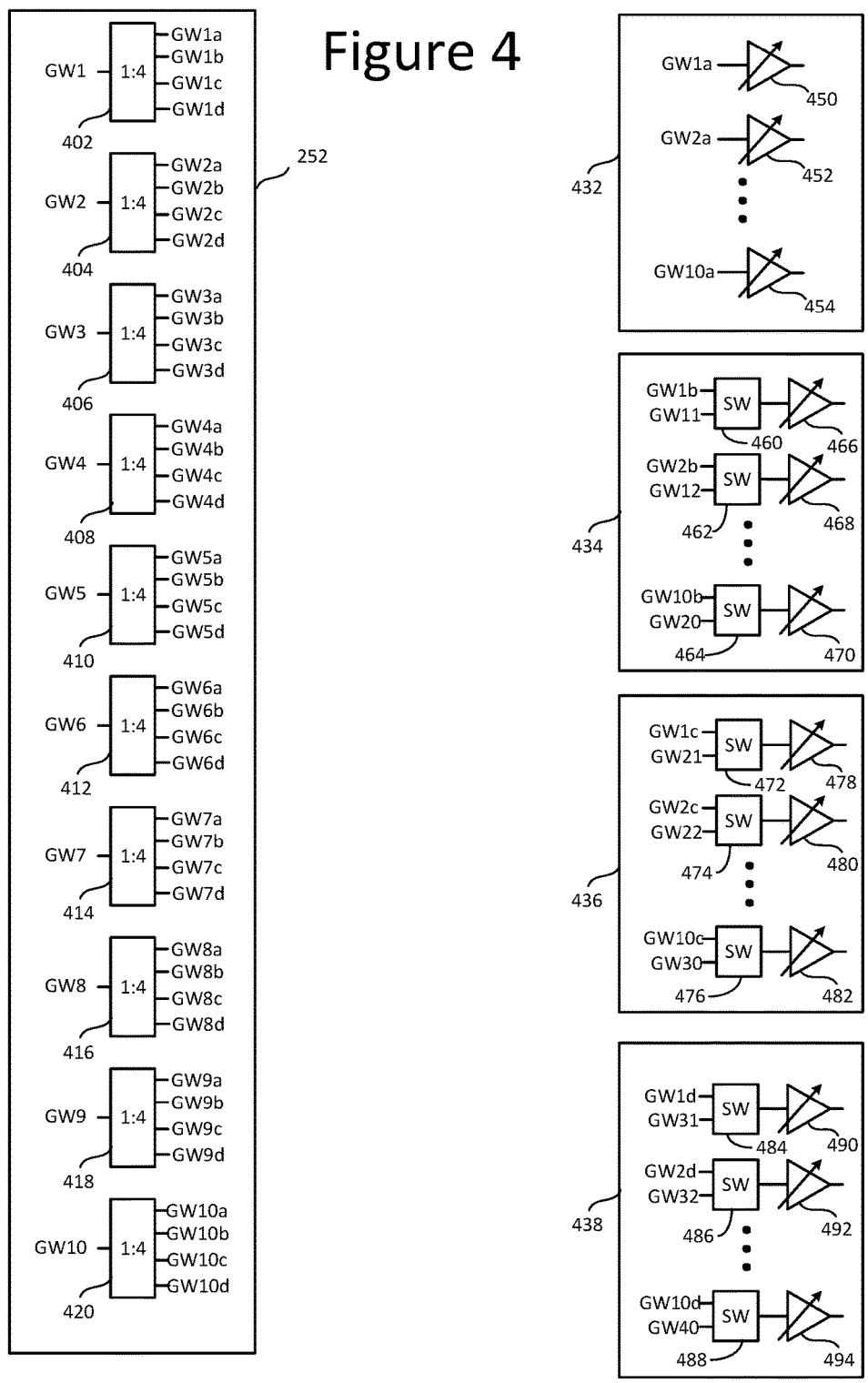
FIG. 4 is a block diagram providing more details of the splitters, optical switch network and tunable optical filters of FIG. 3.

FIG. 4 is a block diagram describing more details of one example implementation of optical splitters 252, optical switch network 254 and tunable optical filters 256. Note that the components of FIG. 4 are for one polarization. Therefore, payload 154 of FIG. 3 would have two sets of the components of FIG. 4, a first set of components for one polarization and a second set of components for the other polarization.

In the example implementation of FIG. 4, it is assumed that the communication system includes 40 gateways (n=40). Additionally, the gateways are grouped into four subsets: the first subset of gateways includes GW1-GW10; the second subset of gateways includes GW11-GW201 the third subset of gateways includes GW21-GW30; and the fourth subset of gateways includes GW31-GW40. As discussed above, optical splitters are used to make copies of some, but not all, of the signals from the gateways. In one embodiment, optical splitters 252 are used to make copies of the signals from the first subset of gateways. That is, optical splitters 252 are used to make copies of the signals from gateways GW1-GW10. Other subsets can also be used. This configuration is set up to allow for a sequential rollout of gateways. For example, the communication system can first be implemented using only the first subset of gateways GW1-GW10. All the resources of the satellite will be used for those ten gateways. At a future time when additional gateways are built or otherwise available, a portion of the second subset of gateways can be added and serviced by the satellite. Eventually, a portion of the third subset and then the fourth subset of gateways can also be serviced by the satellite.

As depicted in FIG. 4, optical splitters 252 includes 1:4 optical splitters 402, 404, 406, 408, 410, 412, 414, 416, 418, and 420. Optical splitter 402 receives the input optical gateway signal from gateway GW1 (via electrical to optical converter 250) and makes four copies: GW1*a*, GW1*b*, GW1*c*, and GW1*d*. The signal GW1 that is the input to optical splitter 402 is received from an electrical to optical converter 250. Optical splitter 404 receives the optical gateway input optical signal from GW2 and makes four copies: GW2*a*, GW2*b*, GW2*c*, and GW2*d*. Optical splitter 406 receives the input optical gateway signal from gateway GW3 and makes four copies: GW3*a*, GW3*b*, GW3*c*, and GW3*d*. Optical splitter 408 receives the input optical gateway signal from gateway GW4 and makes four copies: GW4*a*, GW4*b*, GW4*c*, and GW4*d*. Optical splitter 410 receives the input optical gateway signal from gateway GW5 and makes four copies: GW5*a*, GW5*b*, GW5*c*, and GW5*d*. Optical splitter 412 receives the input optical gateway signal from gateway GW6 and makes four copies: GW6*a*, GW6*b*, GW6*c*, and GW6*d*. Optical splitter 414 receives the input optical gateway signal from gateway GW7 and makes four copies: GW7*a*, GW7*b*, GW7*c*, and GW7*d*. Optical splitter 416 receives input optical gateway signal from gateway GW8 and makes four copies: GW8*a*, GW8*b*, GW8*c*, and GW8*d*. Optical splitter 418 receives the input optical gateway signal from gateway GW9 and makes four copies: GW9*a*, GW9*b*, GW9*c*, and GW9*d*. Optical splitter 420 receives the input optical gateway signal from gateway GW10 and makes four copies: GW10*a*, GW10*b*, GW10*c*, and GW10*d*.

In FIG. 4, the optical switch network 254 and tunable optical filters 256 are arranged in four sets of signal paths, including a first set of signal paths 432, a second set of signal paths 434, a third set of signal paths 436 and a fourth set of signal paths 438. At a high level, optical switching network 254 is configured to send the first subset of the optical gateway signals (GW1-GW10) to the first set of signal paths 432 and send copies of the first subset of optical gateway signals to the second set of signal paths 434, the third set of signal paths 436 and the fourth signal paths 438. For example, GW1*a*, GW2*a*, GW10*a* are provided to first set of signal paths 432. More specifically, GW1*a* is provided directly to tunable optical filter 450, GW2*a* is provided directly to tunable optical filter 452, . . . GW10*a* is provided directly to tunable optical filter 454. Copies of the signals from GW1-GW10 are provided to the second set of signal paths 434. For example, GW1*b*, GW2*b*, . . . GW10*b* are provided to switches 460, 462, . . . 464. Similarly, GW1*c*, GW2*c*,. . . GW10*c* are provided to switches 472, 474, . . . 476 of the third set of signal paths 436. Signals GW1*d*, GW2*d*,. . . GW10*d* are provided to switches 484, 486, . . . 488 of the fourth set of signal paths 438. Optical switching network 254 is also configured to send the second set of optical gateway signals (GW11-GW20) to the second set of signal paths such that the second set of signal paths can switchably provide either the copies of the first subset of the optical gateway signals or the second subset of the optical gateway signals to tunable optical filters 256. For example, switch 460 receives GW1*b* and GW11, switch 462 receives GW2*b* and GW12, . . . switch 464 receives GW10*b* and GW20. Switch 460 chooses between GW1*b* and GW11 and provides the chosen signal to tunable optical filter 466. Switch 462 chooses between GW2*b* and GW12 and provides the chosen signal to the input of tunable optical filter 468. Switch 464 chooses between GW10*b* and GW20 and provides the chosen signal to tunable optical filter 470.

The optical switching network 254 is further configured to send the third set of optical gateway signals (GW21-GW30) to the third set of signal paths 436 such that the third set of signal paths 436 can switchably provide either the copies of the first set of optical gateway signals or the third subset of optical gateway signals to tunable optical filters 256. For example, FIG. 4 shows switch 472 receiving GW1*c* and GW21, switch 474 receiving GW2*c* and GW22, . . . switch 476 receiving GW10*c* and GW30. Switch 472 chooses between GW1*c* and GW21 and provides the chosen signal to tunable optical filter 478. Switch 474 chooses between GW2*c* and GW22 and provides the chosen signal to tunable optical filter 480. Switch 476 chooses between GW10*c* and GW30 and provides the chosen signal to tunable optical filter 482.

Optical switching network 254 is further configured to send the fourth set of optical gateway signals (GW31-GW40) to the fourth set of signal paths 438 such that the fourth set of signal paths can switchably provide either copies of the first subset of the optical gateway signals or the fourth subset of optical gateway signals to tunable optical filters 256. For example, switch 484 receives GW1*d* and GW31, switch 486 receives GW2*d* and GW32, . . . and switch 488 receives GW10*d* and GW40. Switch 484 chooses between GW1*d* and GW31 and provides the chosen signal to tunable optical filter 490. Switch 486 chooses between GW2*d* and GW32 and provides the chosen signal to tunable optical filter 492. Switch 488 chooses between GW10*d* and GW40 and provides the chosen signal to tunable optical filter 494. As depicted in FIG. 4, tunable optical filters 450, 452 454, 466, 468, 470, 478, 480, 482, 490, 492, and 494 are part of tunable optical filters 256. Switches 460, 462, 464, 472, 474, 476, 484, 486 and 488 are part of optical switch network 254. The output of the tunable optical filters depicted in FIG. 4 are connected and provided to demultiplexers 258 depicted in FIG. 3.

The tunable optical filters are integrated modules consisting of micro optics and electronics. When receiving an optical signal at the input port, the tunable optical filter modulates a number of selected channels (e.g., 8 or different number of channels) to the output port. The selected channels can be tuned within the operating wave length (frequency) range by remote commands sent through a built in control processor and firmware. That is, each sub-band can be tuned to a customizable center frequency and a customizable bandwidth. In one embodiment, eight different bandwidths are available including 125, 250, 375, 500, 625, 750, 875, and 1000 Mhz. Each of the eight sub-bands may then be combined in a wave division multiplexed output signal.

Figure 5:
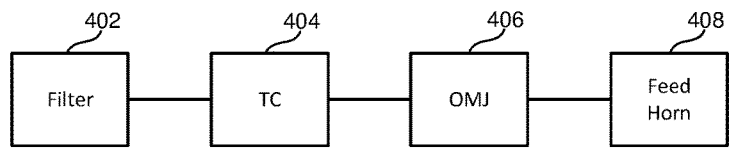
FIG. 5 is a block diagram providing more details of the transmitters of FIG. 3.

FIG. 5 is a block diagram depicting more details of transmitters 290. For example, transmitter 290 can include filter 402, test coupler 404, OMG 406 and feed horn 408. Filter 402 receives the signal from the power amplifier 284 via switch matrix 286 and filters out noise. The output of filter 402 is provided to test coupler 404, which is used to access the signal for testing purposes. The output of test coupler 404 is provided to OMJ 406 which splits the signal into two polarizations. Both polarizations are provided to feed horn 408 for transmission via antenna system 200.

Figure 6:
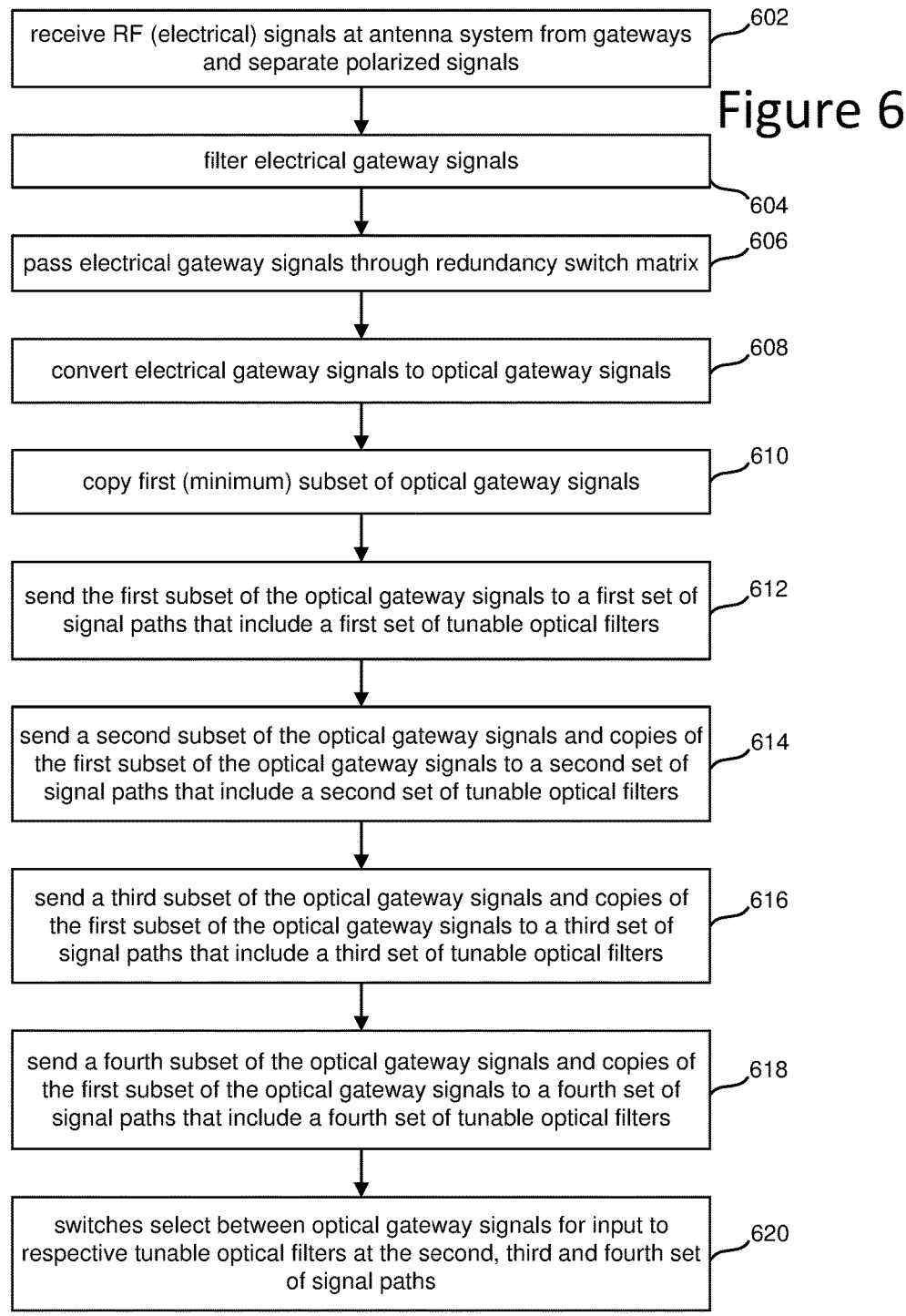

FIGS. 6 and 6A together provide a flow chart describing one embodiment of the process for operating the payload FIGS. 3-5. In step 602 of FIG. 6, antenna system 200 receives the RF (electrical) signals from the gateways and separates the polarized signals (via the respective OMJ). In one embodiment, step 602 is performed continuously. In step 604, the received electrical gateway signals are filtered (see filters 208-230). In step 606, the electrical gateway signals are passed through redundancy switch matrix 240. In step 608, the electrical gateway signals are amplified and converted to optical gateway signals (see electrical to optical converters 250). In step 610, a first (minimum) subset of optical gateway signals are copied (see optical splitters 252). In step 612, the first subset of optical signals are sent to a first set of signal paths that include a first set of tunable optical filters by the optical switch network 254. In step 614, the switch network sends a second subset of the gateway signals and copies of the first subset of optical gateway signals to a second set of signal paths that include a second set of tunable optical filters. In step 616, the optical switch network 254 sends a third subset of the gateway signals and copies of the first subset of optical gateway signals to a third set of signal paths that include a third set of tunable optical filters. In step 618, optical switch network 254 sends a fourth subset of the optical gateway signals and copies of the first subset of the optical gateway signals to a fourth set of signal paths that include a fourth set of tunable optical filters. In step 620, switches as part of the various signal paths mentioned above are used to select between the optical gateway signals for input to the respective tunable filters at the second, third and fourth sets of signal paths. For example, looking at FIG. 4, switches 460, 462, 464, 472, 474, 476, 484, 486 and 488 are used to choose which gateway signal to provide to the respective tunable optical filter.

In step 630, (see FIG. 6A) at each signal path, the corresponding tunable optical filter selects eight (or a different number) sub-bands such that the bandwidth center frequency these sub-bands are independently programmable for each sub-band. For example, the payload could include a processor for controlling and providing control signals to the tunable optical filter 256. In step 632, each tunable optical filter combines the eight (or different number of) sub-bands using wave division multiplexing. In step 634, the multiplexed output of each tunable optical filter is provided to a de-multiplexer (e.g., de-multiplexer 258) with the de-multiplexer converting the data from one combined signal to eight separate signals per original optical gateway signal. In another instance the eight optical outputs of 630 are sent directly to the beamformer network. In some embodiments, steps 632 and 634 are skipped. In step 636, the beam forming network splits the sub-band to multiple copies to weight and combine at least the subset of the signals, resulting in output optical signals. In step 638, beam forming network 260 performs beam hopping on the output optical signals. The beam hopping can be performed on all our subset of signals. In another instance steps 636 and 638 are skipped and the eight optical outputs of 630 are send directly to covert to output electrical signals in 640. In step 640, the output optical signals (after Beamforming/combining and/or beam hopping) are converted to output electrical signals (see optical to electrical converters 272). In step 642, the output electrical signals are combined with other weighted signals and amplified (e.g., LNA 274, switch matrices 282,286, and power amplifier 284). In step 644, the output electrical signals are filtered (e.g., filter 402). In step 646, the output electrical signals are separated into two pluralities (see OMJ 406). In step 648, the output electrical signals are transmitted in downlink service beam to subscriber terminals or to other entities.

As described, with respect to FIGS. 3 and 4, the optical switch network 254 allows the payload to configure which gateway signals are provided to which outputs. That is, optical switch network 254 can change the routing of input gateway signals to output signals. Furthermore, the tunable optical filters allow for selecting different portions of the gateway signals and providing them on different outputs. Furthermore, the optical beam forming network allows different signals to be combined and weighted differently. These three stages provide a level of flexibility so that the operator of the payload can dynamically configure the payload to meet current demand.

Figure 7:
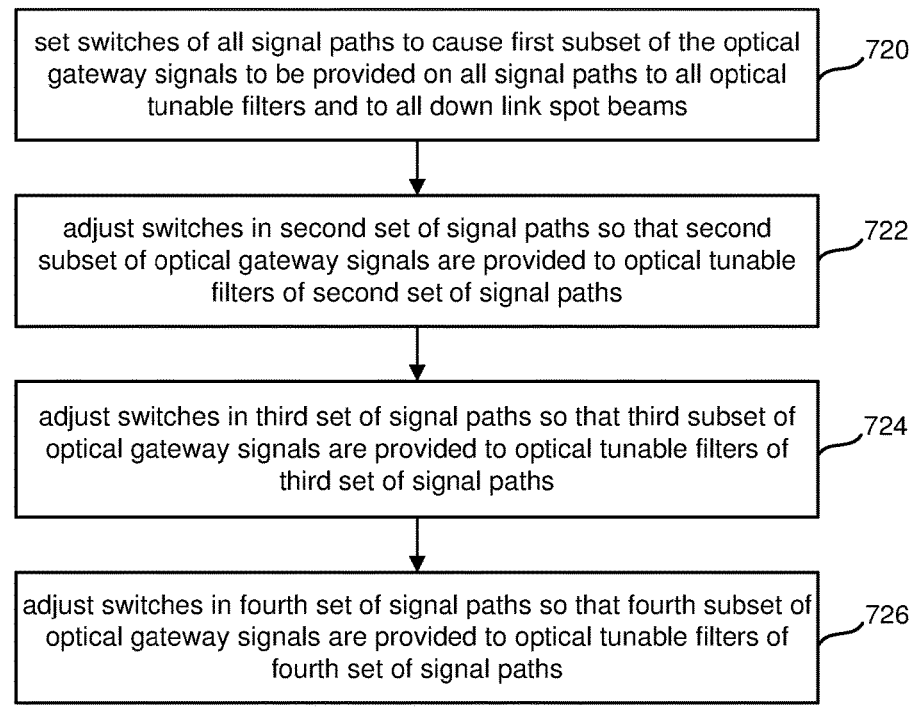
FIG. 7 is a flow chart describing one embodiment of a process for rolling out gateways in stages.

One particular use example for taking advantage of the flexibility described above is to roll out gateways. For example, at a first point in time only gateways GW1-GW10 are used. Therefore, the payload of FIG. 3 is configured to provide all resources for those ten gateways. At later times, additional groups of gateways will be rolled out and the payload will be reconfigured to service those additional gateways. One example of this process is provided in FIG. 7. In step 720 of FIG. 7, the switches of the signal paths of optical switch 254 are set to cause the first subset of the optical gateway signals for GW1-GW10 to be provided on all sets of signal paths (e.g., 432, 434, 436 and 438 of FIG. 4) so that GW1-GW10 can provide communication to all downlink spot beams. At some point in the future, in step 722, the second set of gateways GW11-GW20 will be rolled out and added to the system. The payload of FIG. 3 will adjust the switches of the second set of signal paths (e.g., switches 460, 462, . . . 464) so that the second subset of optical gateways signals for GW11-GW20 are provided are provided to the optical tunable filters (e.g., 466, 468, . . . 470) of the second set of signal paths 434. Later on, the third set of gateways are added to the system and in step 724 the payload will adjust the switches (472, 474, . . . 476) in the third set of signal paths 436 so that the third set of optical gateway signals for GW21-GW30 are provided to the optical tunable filters 478, 480, . . . 482 of the third set of signal paths 436. Sometime later, the system will add the fourth set of gateways. In step 725, the payload adjusts switches (484, 486, . . . 488) in the fourth set of signal paths 438 so that the fourth subset of optical gateway signals for GW31-GW40 are provided to optical tunable filters 490, 492, . . . 494 of the fourth set of signal paths 438. Thus, the system has provided a progressive gateway deployment that can start with less gateways and build out to a full gateway system. When there are fewer gateways deployed, the system has the ability to put gateway capacity to all downlink beams instead of just a limited set of those beams. The GW Select Switch Network can be made more complex by adding switches to support differently partitioned GW roll-out plans. Using the flexibility described above, different bandwidth and different power can be dynamically and flexibly provided to each downlink spot beam.

The examples above trace the forward path, tracing signals transmitted from the gateway to the service terminals. Tracing the signal on the return path follows the same functionality in opposite order using the symmetric technology.

One embodiment includes an apparatus comprising a spacecraft and a payload positioned on the spacecraft. The payload is configured to select a number of sub-bands of a first optical signal such that the bandwidth and center frequency of the sub-bands are independently programmable for each sub-band, the payload is configured to send content of the sub-bands to one or more entities off of the spacecraft.

In one example implementation, the payload comprises: a first tunable optical filter and a second tunable optical filter; an optical splitter configured to make a copy of the first optical signal; and an optical switching network configured to send the first optical signal to a first set of signal paths and send the copy of the first optical signal to a second set of signal paths. The optical switching network is configured to send a second optical signal to the second set of signal paths such that the second set of signals paths can switchably provide either the copy of the first optical signal or the second optical signal to the second tunable optical filter. The first tunable optical filter is configured to receive the first optical signal and select the sub-bands of the first optical signal. The second optical filter in configured to select a number of additional sub-bands of the second optical signal or the copy of the first optical signal as switchably provided by the second set of signals paths such that the bandwidth and center frequency of the additional sub-bands are independently programmable for each sub-band.

One embodiment includes an apparatus comprising electrical to optical converters configured to convert input electrical signals to input optical signals; an optical switching network in communication with the electrical to optical converters, the optical switching network is configured to choose which input optical signals to route to which output beams; tunable optical filters, in communication with the switching network, configured to select programmable sub-bands of the input optical signals to create output optical signals; and optical to electrical converters, in communication with the tunable optical filters, configured to convert the output optical signals to output electrical signals for the output beams.

One embodiment includes an apparatus comprising: an antenna system that receives incoming electrical gateway signals and transmits output electrical signals; electrical to optical converters in communication with the antenna system configured to convert incoming electrical gateway signals to optical gateway signals; optical splitters in communication with the electrical to optical converters and configured to make copies of a first subset of the optical gateway signals; an optical switching network that is configured to send the first subset of the optical gateway signals to a first set of signal paths and copies of the first subset of the optical gateway signals to a second set of signal paths, the optical switching network is configured to send a second subset of the optical gateway signals to the second set of signal paths such that the second set of signals paths can switchably provide either the copies of the first subset of the optical gateway signals or the second subset of the optical gateway signals; a beam forming network in communication with the first set of signal paths and the second set of signal paths, the beam forming network is configured to combine at least a subset of the first set of signal paths and the second set of signal paths to provide output optical signals; and optical to electrical converters in communication with the beam forming network and the antenna system, the optical to electrical converters are configured to convert the output optical signals to output electrical signals for transmission via the antenna system.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic or optical signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. An apparatus, comprising:
a spacecraft; and
a payload positioned on the spacecraft, the payload is configured to receive a wireless communication and to select a subset of sub-bands of a first optical signal representing the wireless communication, the selecting being such that bandwidth and center frequency of the sub-bands are independently programmable for each sub-band, the payload is configured to send content of the selected subset of sub-bands to one or more entities off of the spacecraft.

2. The apparatus of claim 1, wherein the payload comprises:
an electrical to optical converter configured to convert a wireless communication received as an input electrical signal to the first optical signal; and
an optical to electrical converter configured to convert the selected subset of sub-bands of the first optical signal to an output electrical signal for transmission to the one or more entities off of the spacecraft.

3. The apparatus of claim 2, wherein the payload further comprises:
an optical switching network connected to the electrical to optical converter and operable to route the first optical signal to selectable ones of tunable optical filters that are configured to divide the corresponding first predetermined band into said plurality of sub-bands.

4. The apparatus of claim 1, wherein:
the first optical signal is divided into its respective sub-bands while keeping the sub-bands together; and
the payload is configured to de-multiplex the divided first optical signal into separate optical signals corresponding to respective ones of the sub-bands.

5. The apparatus of claim 1, wherein:
the payload is configured to weight and combine at least part of the selected subset of sub-bands.

6. The apparatus of claim 5, wherein:
the payload is configured to perform time domain multiplexed beam hopping when transmitting the selected subset of the sub-bands.

7. The apparatus of claim 1, wherein the payload comprises:
a first tunable optical filter and a second tunable optical filter;
an optical splitter configured to make a copy of the first optical signal; and
an optical switching network configured to send the first optical signal to a first set of signal paths and send the copy of the first optical signal to a second set of signal paths, the optical switching network is configured to send a second optical signal to the second set of signal paths such that the second set of signals paths can switchably provide either the copy of the first optical signal or the second optical signal to the second tunable optical filter, the first tunable optical filter is configured to receive the first optical signal and select the sub-bands of the first optical signal, the second optical filter is configured to programmably divide the second optical signal into corresponding additional sub-bands so as to enable programmable selection of a number of additional sub-bands of the second optical signal or of the copy of the first optical signal as switchably provided by the second set of signals paths such that respective bandwidths and center frequencies of the additional sub-bands are respectively independently programmable.

8. The apparatus of claim 1, wherein:
the payload includes an antenna system that receives incoming electrical gateway signals and transmits output electrical signals;
the payload includes electrical to optical converters connected to the antenna system, the electrical to optical converters are configured to convert incoming electrical gateway signals to optical gateway signals, the first optical signal is one of the optical gateway signals; and
the payload includes optical to electrical converters that are configured to convert one or more of selected sub-bands of the first output optical signal to output electrical signals for transmission to the one or more entities off of the spacecraft.

9. An apparatus, comprising:
electrical to optical converters configured to convert input electrical signals of the apparatus to input optical signals each representing a corresponding one of the input electrical signals;
an optical switching network in communication with the electrical to optical converters, the optical switching network is configured to choose which input optical signals to respectively route to respective optical outputs of the optical switching network;
tunable optical filters, in communication with the optical outputs of the optical switching network, configured to select programmably-defined sub-bands of respective ones of the routed input optical signals to create output optical signals each formed from a subset of the programmably-defined sub-bands; and
optical to electrical converters, in communication with the tunable optical filters, configured to convert the output optical signals to output electrical signals for output from the apparatus.

10. The apparatus of claim 9, wherein:
respective ones of the tunable optical filters are configured to respectively select respective sub-bands of the input optical signals such that respective bandwidths and center frequencies of the respectively selected sub-bands are independently programmable.

11. The apparatus of claim 10, further comprising:
an optical beam forming network in communication with the optical to electrical converters; and
an optical demultiplexer connected between the tunable optical filters and the optical beam forming network, where the tunable optical filters are configured to divide each respective one of the routed input optical signals into respective but still together, respective sub-bands and the optical demultiplexer is configured to separate the division-defined sub-bands so as to form respective separated sub-band signals.

12. The apparatus of claim 9, further comprising:
an antenna system in communication with the electrical to optical converters and the optical to electrical converters, the antenna system configured to receive the input electrical signals in the V band and transmit the output electrical signals for the output beams in Ka band.

13. The apparatus of claim 9, further comprising:
an antenna system in communication with the electrical to optical converters and the optical to electrical converters, the antenna system configured to receive incoming dual polarized signals from gateways and transmit the output electrical signals; and
orthogonal mode junctions in communication with the antenna system and the electrical to optical converters, the orthogonal mode junctions split the incoming dual polarized signals into separate single polarization signals.

14. The apparatus of claim 9, further comprising:
optical splitters in communication with the electrical to optical converters, the optical splitters are configured to make copies of a first subset of the input optical signals, the optical switching network is configured to send the first subset of the input optical signals to a first set of signal paths and to send copies of the first subset of the input optical signals to a second set of signal paths, the first set of signal paths include a first subset of the tunable optical filters, the second set of signal paths include a second subset of the tunable optical filters, the optical switching network sends a second subset of the input optical signals to the second set of signal paths such that the second set of signals paths can switchably provide to the second subset of the tunable optical filters either the copies of the first subset of the input optical signals or the second subset of the input optical signals.

15. The apparatus of claim 14, wherein:
a beam forming network connected to the first subset of the tunable optical filters and the second subset of the tunable optical filters, the beam forming network is also connected to the optical to electrical converters, the beam forming network is configured to combine at least a subset of the first set of signal paths and the second set of signal paths.

16. The apparatus of claim 15, wherein:
the tunable optical filters are configured to select sub-bands of the input optical signals such that the bandwidth and center frequency of the sub-bands are independently programmable for each sub-band.

17. The apparatus of claim 9, further comprising:
a beam forming network in communication with the tunable optical filters and the optical to electrical converters, the beam forming network configured to perform beam hopping on the output optical signals prior to the output optical signals reaching the optical to electrical converters.

18. An apparatus comprising:
an antenna system that receives incoming electrical gateway signals and transmits output electrical signals;
electrical to optical converters in communication with the antenna system configured to convert incoming electrical gateway signals to optical gateway signals;
optical splitters in communication with the electrical to optical converters and configured to make copies of a first subset of the optical gateway signals;
an optical switching network that is configured to send the first subset of the optical gateway signals to a first set of signal paths and copies of the first subset of the optical gateway signals to a second set of signal paths, the optical switching network is configured to send a second subset of the optical gateway signals to the second set of signal paths such that the second set of signals paths can switchably provide either the copies of the first subset of the optical gateway signals or the second subset of the optical gateway signals;
a beam forming network in communication with the first set of signal paths and the second set of signal paths, the beam forming network is configured to combine at least a subset of the first set of signal paths and the second set of signal paths to provide output optical signals; and
optical to electrical converters in communication with the beam forming network and the antenna system, the optical to electrical converters are configured to convert the output optical signals to output electrical signals for transmission via the antenna system.

19. The apparatus of claim 18, further comprising:
a first set of tunable optical filters connected to the first set of signal paths; and
a second set of tunable optical filters connected to the second set of signal paths.

20. The apparatus of claim 19, further comprising:
optical demultiplexers in communication with the beam forming network, the first set of tunable optical filters and the second set of tunable optical filters, the first set of tunable optical filters are configured to select programmable sub-bands of the first subset of the optical gateway signals to provide to the optical demultiplexers, the second set of tunable optical filters are configured to select programmable sub-bands of inputs to the second set of tunable optical filters to provide to the optical demultiplexers.

21. The apparatus of claim 18, wherein:
the optical switching network is configured to send copies of the first subset of the optical gateway signals to a third set of signal paths and a fourth set of signal paths, the optical switching network is configured to send a third subset of the optical gateway signals to the third set of signal paths such that the third set of signals paths can switchably provide either the copies of the first subset of the optical gateway signals or the third subset of the optical gateway signals,
the optical switching network is configured to send a fourth subset of the optical gateway signals to the fourth set of signal paths such that the fourth set of signals paths can switchably provide either the copies of the first subset of the optical gateway signals or the fourth subset of the optical gateway signals; and
the beam forming network is connected to the third set of signal paths and the fourth set of signal paths, the beam forming network configured to combine at least a subset of the first, second, third and fourth sets of signal paths to provide the output optical signals.

* * * * *